US012712937B2

(12) United States Patent
Thompson et al.

(10) Patent No.: US 12,712,937 B2
(45) Date of Patent: Aug. 18, 2026

(54) AGENT-BASED REMOTE DESKTOP PROTOCOL SESSION CONTROL

(71) Applicant: Ivanti, Inc., South Jordan, UT (US)

(72) Inventors: Blake Alan Thompson, Saratoga Springs, UT (US); Scot Emery Swan, Mapleton, UT (US); Donald Saxby, Salt Lake City, UT (US)

(73) Assignee: Ivanti, Inc., South Jordan, UT (US)

( * ) Notice: Subject to any disclaimer, the term of this patent is extended or adjusted under 35 U.S.C. 154(b) by 0 days.

(21) Appl. No.: 18/760,651

(22) Filed: Jul. 1, 2024

(65) Prior Publication Data

US 2025/0007976 A1 Jan. 2, 2025

Related U.S. Application Data

(63) Continuation of application No. 18/296,338, filed on Apr. 5, 2023, now Pat. No. 12,028,402.

(60) Provisional application No. 63/328,021, filed on Apr. 6, 2022.

(51) Int. Cl.

*H04L 67/025* (2022.01)
*G06F 21/31* (2013.01)
*H04L 9/32* (2006.01)

(52) U.S. Cl.

CPC ............ *H04L 67/025* (2013.01); *G06F 21/31* (2013.01); *H04L 9/3213* (2013.01)

(58) Field of Classification Search

None

See application file for complete search history.

(56) References Cited

U.S. PATENT DOCUMENTS 11,659,042 B1 * 5/2023 Gafa ..................... H04L 67/125 709/227
2010/0281173 A1 * 11/2010 Vutukuri ............... G06F 21/305 709/228
2011/0239133 A1 * 9/2011 Duffus .................... G06F 9/461 715/753
2012/0254447 A1 * 10/2012 Popescu .............. H04L 63/0442 709/227
2014/0045457 A1 * 2/2014 Mahaffey .............. H04W 64/00 455/410
2014/0122687 A1 * 5/2014 Luciani, Jr. ............. H04L 67/14 709/223
2016/0359983 A1 * 12/2016 Balogh ................... H04L 67/34
2017/0323418 A1 * 11/2017 Dror ................... G06F 9/45558
2022/0407713 A1 * 12/2022 Bahety .................. H04L 9/0891

(Continued)

*Primary Examiner* — Joshua Joo

(57) ABSTRACT

A method of remote desktop protocol (RDP) operating system (OS) session remote-control includes providing security credentials to a client device. The method includes requesting OS sessions currently operating on the client device. The method includes receiving from an agent on the client device, an indication of OS sessions currently operating on the client device. The OS sessions include one or more RDP OS sessions and a console OS session. The method includes selecting a first RDP OS session of the one or more RDP OS sessions. Responsive to the selection of the first RDP OS session, the method includes communicating with an agent an instruction to initiate a remote-control interface with the client device. The remote-control interface is configured such that the agent transmits visual data of the RDP OS session to the service device and relays commands from the service device.

18 Claims, 9 Drawing Sheets

(56) References Cited

U.S. PATENT DOCUMENTS

2023/0403280 A1* 12/2023 Tuch .................... H04L 63/101
2025/0165895 A1* 5/2025 Barhoumeh ........ H04L 65/4015

* cited by examiner

AGENT-BASED REMOTE DESKTOP PROTOCOL SESSION CONTROL

CROSS-REFERENCE TO RELATED APPLICATION

This application claims the benefit of and priority to U.S. patent application Ser. No. 18/296,338, filed Apr. 5, 2023, which claims benefit to U.S. Provisional Application No. 63/328,021, filed Apr. 6, 2022, which is incorporated herein by reference in its entirety.

FIELD

The embodiments described in this disclosure are related to remote desktop applications and session control of remote desktop connections, and in particular to remote desktop application and session control using agents.

BACKGROUND

Remote desktop applications enable use of a first device by a second, remote device over a network connection. A connection using a remote desktop application between two or more devices is sometimes referred to as a remote desktop connection. The remote desktop applications allow communication of data such that operation of the second device is implemented on the first device. For example, the second device may access an application hosted on the first device or may access a file stored at the first device. During access, a user of the second device can see desktop data and information on the first device.

The remote desktop applications allow flexibility in office or user locations. For instance, the user may "remote into" a home or centralized location while traveling. Additionally, the remote desktop applications may enable optimization of computing resources. For instance, an application may be hosted on a high-performance device. Lower-performance devices may then remote into the high-performance device to use the application.

Conventional remote desktop applications suffer from several shortcomings. For instance, remote desktop applications suffer from security issues. In particular, open ports and firewall penetrations often result from improperly managed remote desktop connections. Additionally, management device visibility and command communication into the remote desktop connections introduce additional security and privacy issues, which might result in limited involvement by management devices in remote desktop connections. Moreover, use of remote desktop applications takes time and bandwidth. The time and bandwidth usage increases as a number of participants increases. Accordingly, a need exists to provide an improved remote desktop system that addresses these and other issues with conventional remote desktop applications and systems.

The subject matter claimed herein is not limited to embodiments that solve any disadvantages or that operate only in environments such as those described. Rather, this background is only provided to illustrate one example technology area where some embodiments described herein may be practiced.

SUMMARY

According to an aspect of the invention, an embodiment includes a method of remote desktop protocol (RDP) operating system (OS) session remote-control. The method may include providing, by a service device, security credentials to a client device. The method may include requesting, by the service device, OS sessions currently operating on the client device. The method may include receiving from an agent on the client device, an indication of OS sessions currently operating on the client device. The OS sessions may include one or more RDP OS sessions and a console OS session. The method may include selecting, at the service device, a first RDP OS session of the one or more RDP OS sessions. Responsive to the selection of the first RDP OS session, the method may include communicating with an agent an instruction to initiate a remote-control interface with the client device. The remote-control interface is configured such that the agent transmits visual data of the RDP OS session to the service device and relays commands from the service device.

An additional aspect of an embodiment includes a non-transitory computer-readable medium having encoded therein programming code executable by one or more processors to perform or control performance at least a portion of the method described above.

Yet another aspect of an embodiment includes a computer device. The computer device may include one or more processors and a non-transitory computer-readable medium. The non-transitory computer-readable medium has encoded therein programming code executable by the one or more processors to perform or control performance of one or more of the operations of the methods described above.

The object and advantages of the embodiments will be realized and achieved at least by the elements, features, and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF SOME EXAMPLE EMBODIMENTS

Figure 1A:
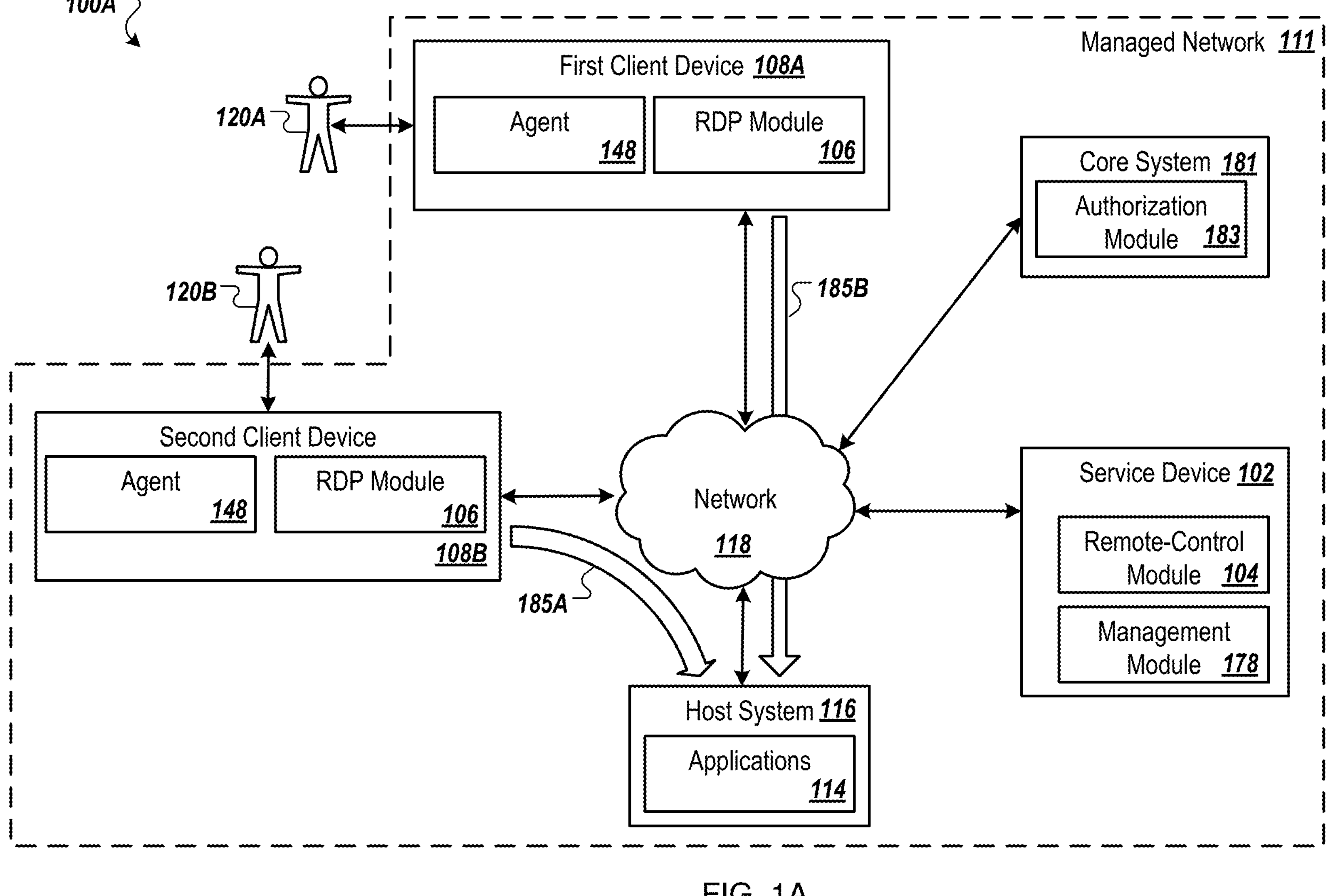
FIG. 1A depicts a block diagram of a first example operating environment.

Embodiments of the present disclosure are related to remote desktop applications and session control of remote desktop connections and sessions. In some embodiments, disclosed embodiments leverage endpoint management agents having a high level of privilege on client devices to provide security, visibility, and control of the remote desktop sessions.

Some embodiments are described with reference to the remote desktop protocol (RDP). The RDP is developed by Microsoft® and offered in many Windows® operating systems offered by Microsoft. The RDP is a common protocol in which remote desktops are initiated and controlled. Although RDP is common and used in many embodiments, the embodiments of the present invention are not limited to Microsoft RDP operating system (OS) sessions only. For instance, the remote desktop OS connection might be supported by other remote desktop applications such as Team Viewer™, AnyDesk™, ConnectWise Control™, etc. Throughout this disclosure, RDP OS is used as a shorthand for remote desktop OS sessions supported by any similar remote desktop applications.

In some embodiments, an RDP OS session involves at least one client device that is included in a managed network. The client device may remotely connect to a second device to access a software application or file located at the second device. For instance, the second device may host the software application for multiple clients or may be another device associated with a user of the client device. The RDP OS session enables the client device to view information communicated via the RDP connection and/or communicate command signals configured to modify operation of the second device.

In conventional systems, the RDP session is configured according to the RDP or another remote desktop application. The RDP and the remote desktop applications may introduce security issues especially when RDP session is viewed and controlled by a third-party manager. Moreover, as a number of RDP OS sessions increase, network bandwidth between participating devices increases, which increases latency of visual data and command data.

Embodiments of the present invention address these and other shortcomings of conventional systems. For instance, some embodiments implement an agent related to endpoint management to coordinate RDP OS sessions. The agent may be configured to have a high level of privilege on the involved devices. Accordingly, the agent can obtain information from systems on the devices and communicate this information. Moreover, instructions communicated via an RDP session may be received and routed by the agent. Thus, the agent is configured to communicate information from the RDP session to one or more remote computing devices.

Additionally, the agent may be configured to detect information related to operating system (OS) sessions on the devices involved in the RDP session. The OS sessions may include RDP OS sessions and console OS sessions. Information related to the OS sessions may be communicated to a service device, which may manage the involved devices. The service device may then select which OS session to join and may individually provide security information to involved devices prior to joining.

Moreover, following initiation of a RDP OS session with the service device, the agent may communicate visual data from the involved devices to the service device such that the visual data displayed on the service device is substantially similar to visual data on the involved devices at substantially the same time. Additionally, the service device may accept commands and instructions locally. The commands and instructions may be relayed to the agent, which may then implement the commands and instructions on the involved devices.

In some embodiments, the service device may be granted permission to join the RDP session from a central or core system. The core system may communicate an access token to the remote computing device. The access token may be included in security credentials that at least partially enable access to the RDP OS sessions. Accordingly, access by the service device is based on and controlled by the core system as well as the involved devices.

These and other embodiments are described with reference to the appended Figures in which like item number indicates like function and structure unless described otherwise. The configurations of the present systems and methods, as generally described and illustrated in the Figures herein, may be arranged and designed in different configurations. Thus, the following detailed description of the Figures, is not intended to limit the scope of the systems and methods, as claimed, but is merely representative of example configurations of the systems and methods.

Figure 1B:
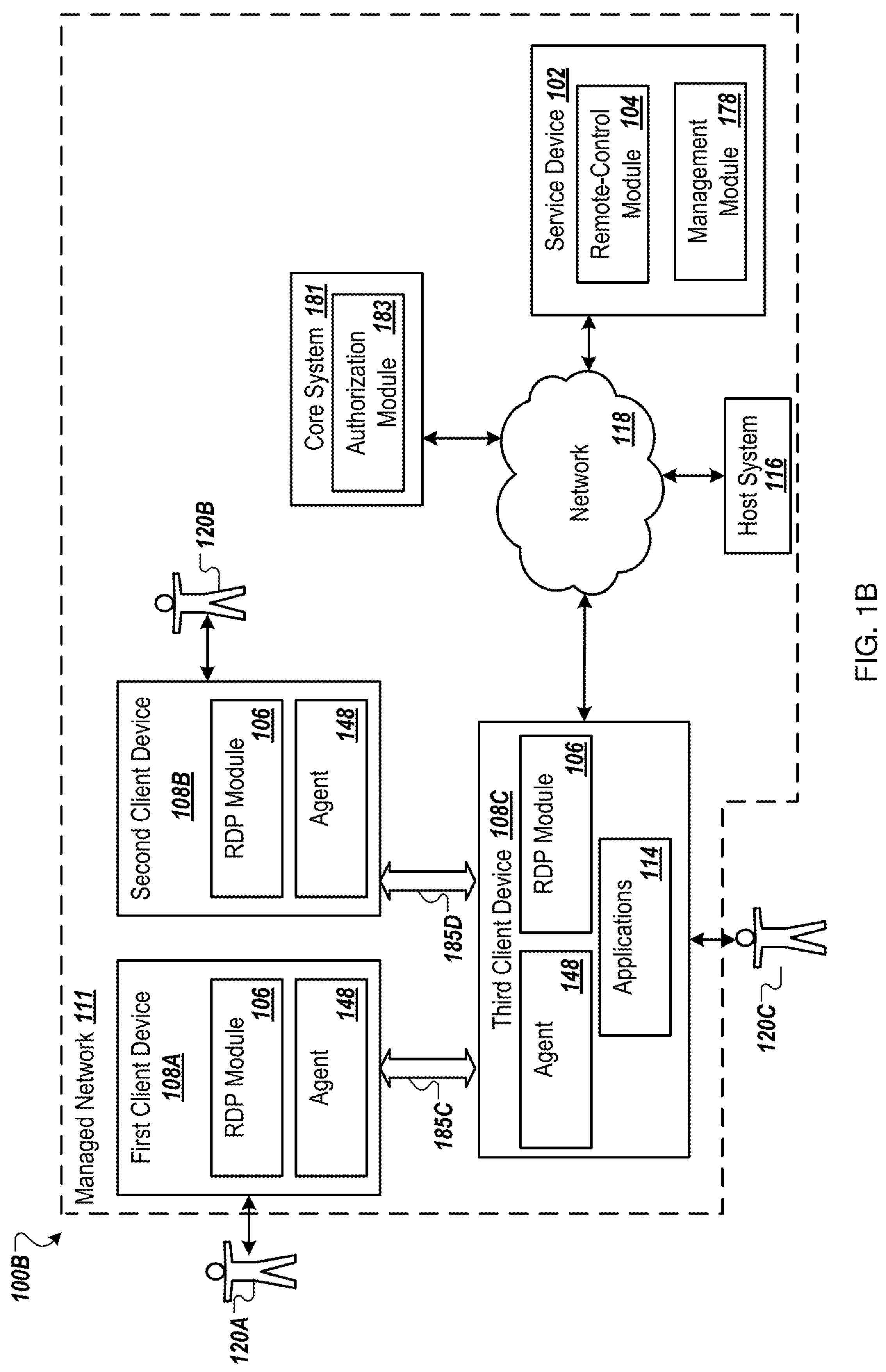
FIG. 1B depicts a block diagram of a second example operating environment.

FIGS. 1A and 1B illustrate example operating environments 100A and 100B in which some embodiments described in the present disclosure may be implemented. The operating environments 100A and 100B are described together, then differences between the two environments are described relative to each of FIGS. 1A and 1B.

The operating environments 100A and 100B include a service device 102 that is configured to remotely control RDP operating system (OS) sessions 185A-185D (generally RDP OS sessions 185 or RDP OS session 185). Remote-control of the RDP OS sessions 185 enable the service device 102 to view information and data communicated in the RDP OS sessions 185 and communicate commands to client devices 108A-108C (generally, client device 108 or client devices 108) via the RDP OS sessions 185, which are implemented by the client devices 108.

The service device 102 may implement a management module 178 that interfaces with agents 148 at the devices. The control of the RDP OS sessions 185 may be implemented through the agents 148. For instance, the agents 148 may initiate a management session with one or more of the RDP OS sessions 185 based on commands sent from the service device 102. Additionally, the agents 148 may communicate visual data to the service device 102 and receive commands from the service device 102, which are implemented on the client devices 108.

The operating environments 100A and 100B may additionally include a core system 181, a host system 116, and a network 118. The client devices 108, the service device 102, the core system 181, and the host system 116 are configured to communicate data and information via the network 118. Each of these environmental components are introduced in the following paragraphs.

The network 118 may include any communication network configured for communication of signals between the components (e.g., 102, 108, 181, and 116) of the operating environments 100A and 100B. The network 118 may be wired or wireless. The network 118 may have configurations including a star configuration, a token ring configuration, or another suitable configuration. Furthermore, the network 118 may include a local area network (LAN), a wide area network (WAN) (e.g., the Internet), and/or other interconnected data paths across which multiple devices may communicate. In some embodiments, the network 118 may include a peer-to-peer network. The network 118 may also be coupled to or include portions of a telecommunications network that may enable communication of data in a variety of different communication protocols.

In some embodiments, the network 118 includes or is configured to include a BLUETOOTH® communication network, a Z-Wave® communication network, an Insteon® communication network, an EnOcean® communication network, a Wi-Fi communication network, a ZigBee communication network, a representative state transfer application protocol interface (REST API) communication network, an extensible messaging and presence protocol (XMPP) communication network, a cellular communications network, any similar communication networks, or any combination thereof for sending and receiving data. The data communicated in the network 118 may include data communicated via short messaging service (SMS), multimedia messaging service (MMS), hypertext transfer protocol (HTTP), direct data connection, wireless application protocol (WAP), or any other protocol that may be implemented in the components of the operating environments 100A and 100B.

The host system 116 may include a hardware-based system configured to communicate data and information with other environment components via the network 118. In a first operating environment 100A of FIG. 1A, the host system 116 may host applications 114. The applications 114 might include software programs and applications. Additionally, the applications 114 might include drivers or access to hardware systems that may not be available on the client devices 108. In some embodiments, the host system 116 is different from the client devices 108. For instance, the host system 116 may be a server having computing capabilities that exceed those of the client device 108. In these and other embodiments, the client devices 108 may implement the RDP OS sessions 185 to access the applications 114. An example circumstance in which the client devices 108 access the host system 116 may include a network in which the client devices 108 are thin clients, which might have limited computing power, limited storage, and limited security levels. The thin clients may access the applications 114 on the host system 116 using the RDP OS sessions 185A and 185B.

In the second operating environment 100B of FIG. 1B, the applications 114 may be hosted on a third client device 108C. The third client device 108C may be substantially equivalent to a first and a second client devices 108A and 108B. The applications 114 on the third client device 108C may have limited availability or may have a specialized security or computing requirement. In the second operating environment 100B, the first and the second client devices 108A and 108B may access the applications 114 using the RDP OS sessions 185C and 185D, respectively.

In the second operating environment 100B, the first and second client devices 108A and 108B may be acting as a secondary device that are accessing the applications 114 on the third client device 108C. The third client device 108C may support a third and a fourth RDP OS session 185C and 185D via which the applications 114 are remotely accessed. The agent 148 on the third client device 108C may enable the service device 102 to remotely control the two or more secondary devices (e.g., the client devices 108A and 108B) one at a time or concurrently. In these and other embodiments, the agent 148 on the third client device 108C may enable remote-control of the first and second client devices 108A and 108B at least partially via the RDP OS sessions 185C and 185D.

Referring back to FIGS. 1A and 1B, the core system 181 may include a hardware-based computing device configured to communicate with other environment components via the network 118. The core system 181 may include an authorization module 183, which is configured to authorize the service device 102 relative to the client devices 108. For instance, the service device 102 may seek a control session of one or more of the RDP OS sessions 185. Prior to initiating the control session, the service device 102 may submit a request to the core system 181 for authentication. The request may include login information of an entity associated with the service device 102. In response, the authorization module 183 of the core system 181 may authenticate the service device 102 based at least partially on the login information. Responsive to an authentication, the authorization module 183 may communicate an access token to the service device 102.

The client devices 108 may include hardware-based computing systems configured to communicate with the other environment components of the operating environments 100A and 100B via the network 118. The client devices 108 may include the agents 148 and the RDP module 106.

The agents 148 may be installed on the client devices 108. The agents 148 may provide a management module 178 of the service device 102 with information about the associated client device 108. The information collected about the client device 108 via the agents 148 may be used to manage the client devices 108. For example, the agents 148 may collect information related to hardware installed at the client devices 108, software applications installed on the client devices 108, status of the hardware and software applications (e.g., versions, age, operating parameters, etc.), users 120A-120C (generally, users 120 or user 120) associated with the client devices 108, other information related to management of the client devices 108, or combinations thereof.

To collect the information, the agents 148 may have a high level of privilege on the client devices 108. For instance, the agents 148 may be able to interface with the software applications and hardware of the client devices 108, pull visual data from displayed on the client devices 108, deliver or implement commands to the software applications, etc.

In the embodiments of FIGS. 1A and 1B, the client devices 108, the host system 116, the core system 181, and the service device 102 are included in the managed network, which is generally indicated by 111. The managed network 111 is implemented to enable management of the client devices 108 by the service device 102 and/or the core system 181. To implement the managed network 111, the client devices 108 may be enrolled. The agents 148 may be loaded onto the client devices 108 during the enrollment operation. After the client devices 108 are enrolled in the managed network 111, ongoing management of the client devices 108 may be implemented by the service device 102 and/or the core system 181. The ongoing management may include overseeing and dictating at least a part of the operations at the client devices 108. In embodiments in which the client devices 108 are included in the managed network 111, the client devices 108 are managed devices.

The managed network 111 may be associated with or implemented by an enterprise, a portion of an enterprise, a government entity, or another entity. For instance, the client devices 108 may be associated with employees of an entity and the core system 181 or the host system 116 may store or host enterprise data and/or enterprise-specific applications. The core system 181 may include a central repository of security information which may serve as the basis of authorization of the service device 102.

The client devices 108 may be involved in one or more of the RDP OS sessions 185. In the RDP OS sessions 185, the client devices 108 are remotely accessing the applications 114 hosted on a remote device such as the host system 116 or the third client device 108C. Additionally, the client devices 108 may be implementing a console OS session. The console OS session refers to the client device 108 accessing local applications.

The RDP module 106 may be configured to support remote-control of the RDP OS sessions 185. The RDP module 106 may be configured to interface with a remote-control module 104 of the service devices 102. For instance, the RDP module 106 may be configured to ensure the service device 102 is authentic and to give permission to the service device 102 to remote-control one or more of the RDP OS sessions 185.

For instance, in some embodiments, the RDP module 106 may receive from the service device 102 security credentials. The security credentials may include an access token provided to the service device 102 following an authentication operation with core system. Additionally, the RDP module 106 may receive a request for OS sessions (e.g., RDP and console) currently operating on the client device 108.

Responsive to the request, the RDP module 106 or the agent 148 may provide an indication of OS sessions, both the RDP OS sessions 185 and a console OS session currently operating on the client device 108. The RDP module 106 may then receive a selection of a first RDP OS session (e.g., RDP OS sessions 185). Responsive to receipt of the selection and an instruction to initiate a remote-control interface, the RDP module 106 and the agent 148 may initiate a remote-control interface with the service device 102. The remote-control interface is configured such that the agent 148 transmits visual data of the RDP OS session to the service device 102 and relays commands from the service device 102 to the client device 108 or the host system 116.

When the remote-control interface is established, the remote-control module 104 may receive and display visual data transmitted in the RDP OS sessions 185. Additionally, the remote-control module 104 may communicate instructions and commands to devices (either the client devices 108 or the client devices 108 and host system 116), which are implemented locally at least partially by the agents 148.

The service device 102 may include a hardware-based computing device that is configured to communicate data and information with the other environment components via the network 118. The service device 102 may include the management module 178 and the remote-control module 104.

The management module 178 is configured to manage the client devices 108. In some embodiments, the management module 178 interfaces with the agents 148 and the core system 181 to monitor operation of the client devices 108 and the users 120. The management module 178 may communicate instructions to the client devices 108 via the management module 178 and the agents 148. For instance, the management module 178 may communicate a command via the agent 148 to the first client device 108A to remove an application, patch an application, mitigate a technical issue, etc. In the embodiments of FIGS. 1A and 1B, the management module 178 is included in the service device 102. In other embodiments, the management module 178 may be included in the core system 181.

The remote-control module 104 may be configured to initiate a remote-control interface with one or more of the RDP OS session 185 and to view and to selectively control operations on the RDP OS session 185. For instance, in some embodiments, The remote-control module 104 may provide the security credentials received from the core system 181 to one or more of the client devices 108. For instance, the remote-control module 104 may provide the access token to the client devices 108. The remote-control module 104 may request OS sessions currently operating on the one or more client devices 108.

The remote-control module 104 may receive from or via the agent 148 on the client devices 108, an indication of OS sessions currently operating on the client devices 108. The OS sessions may include one or more RDP OS sessions 185 and one or more console OS sessions. The remote-control module 104 may select or convey a selection of one or more of the RDP OS sessions 185.

Responsive to the selection of one or more of the RDP OS sessions 185, the remote-control module 104 may communicate with the agent 148 an instruction to initiate the remote-control interface with the client devices 108. The remote-control interface is configured such that the agent 148 transmits visual data of the RDP OS session 185 to the service device 102 and relays commands from the service device 102 to the client devices 108 or host system 116.

The remote-control module 104 may enable multiple, concurrent remote-control interface with multiple RDP OS sessions 185. For instance, the remote-control module 104 may communicate with the first client device 108A, a second client device 108B, and the third client device 108C of FIG. 1B. Remote-control interfaces may be established to remotely control a first RDP OS session 185A, a second RDP OS session 185B, a third RDP OS session 185C of FIG. 1B, a fourth RDP OS session 185D, or any combination thereof.

Additionally, with reference to FIG. 1B, through communication with the agent 148 on the third client device 108C, the remote-control module 104 may be able to select between the third RDP OS session 185C and the fourth RDP OS session 185D. Because the agents 148 are present on the first client device 108A, the second client device 108B, and the third client device 108C, the remote-control module 104 may initiate a remote-control interface on both the third RDP OS session 185C and the fourth RDP OS session 185D concurrently.

In some embodiments, the core system 181, the service device 102, the host system 116, or combinations thereof may be a single server or computing device, a set of servers, a virtual device, or a virtual server in a cloud-based network of servers. In these and other embodiments, the components thereof (e.g., 104, 178, 183, etc.) may be virtualized across multiple physical machines.

The agents 148, the management module 178, the remote-control module 104, the RDP module 106, the applications 114 (collectively, modules), and components thereof may be implemented using hardware including a processor, a microprocessor (e.g., to perform or control performance of one or more operations), a field-programmable gate array (FPGA), or an application-specific integrated circuit (ASIC). In some other instances, the modules and components thereof may be implemented using a combination of hardware and software. Implementation in software may include rapid activation and deactivation of one or more transistors or transistor elements such as may be included in hardware of a computing system (e.g., the client devices 108, the core system 181, the service device 102, or the host system 116 of FIGS. 1A and 1B). Additionally, software defined instructions may operate on information within transistor elements. Implementation of software instructions may at least temporarily reconfigure electronic pathways and transform computing hardware.

Modifications, additions, or omissions may be made to the operating environments 100A and 100B without departing from the scope of the present disclosure. For example, the operating environments 100A and 100B may include one or more client devices 108, one or more service devices 102, one or more host systems 116, one or more core systems 181, one or more networks 118, or any combination thereof. Moreover, the separation of various components and devices in the embodiments described herein is not meant to indicate that the separation occurs in all embodiments. Moreover, it may be understood with the benefit of this disclosure that the described components and servers may be integrated together in a single component or server or separated into multiple components or servers.

Figure 2:
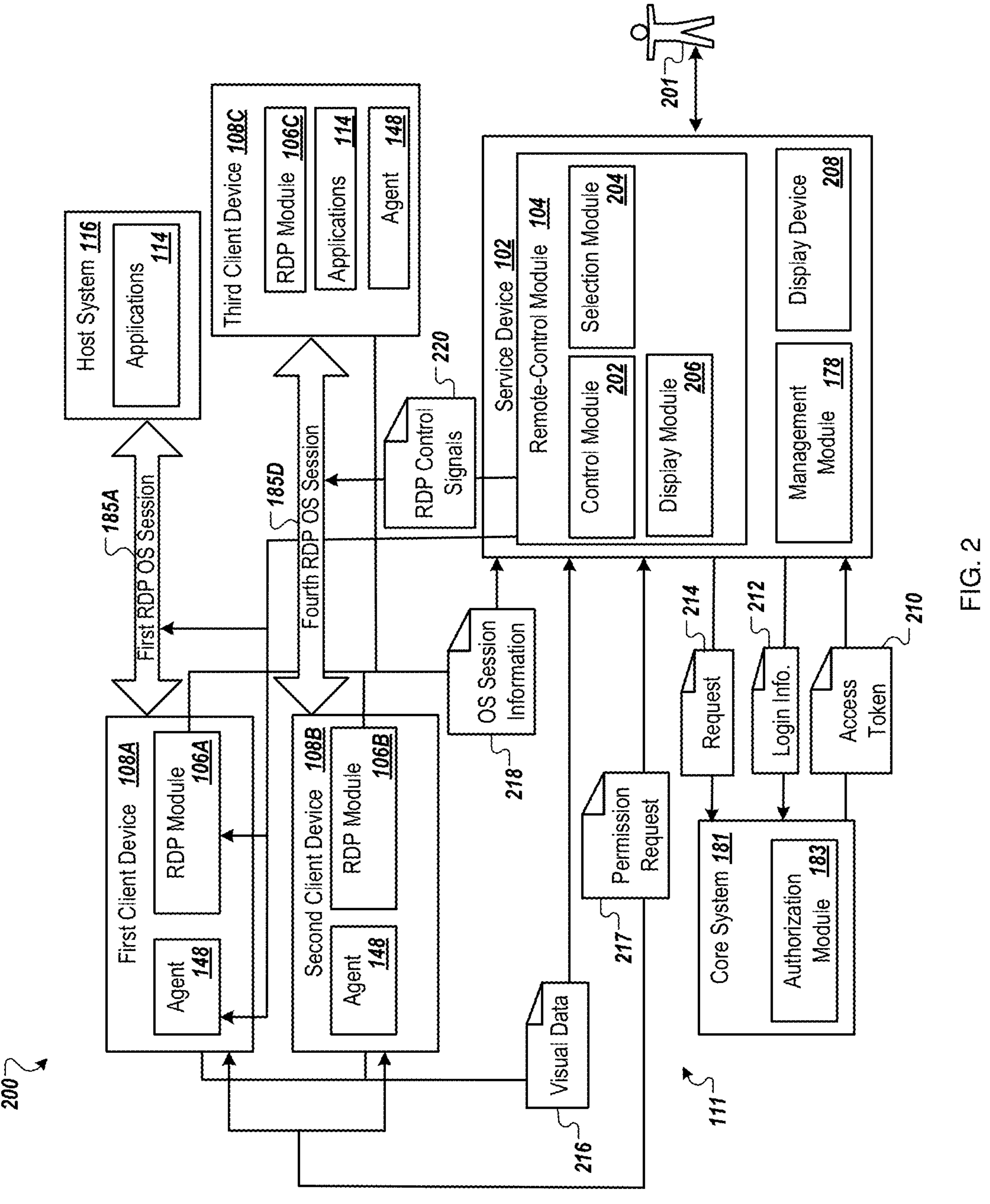
FIG. 2 depicts an example remote desktop protocol (RDP) operating system (OS) session remote-control process (control process) that may be implemented in the operating environments of FIGS. 1A and 1B.

FIG. 2 depicts an example RDP OS session remote-control process (control process) 200 that may be implemented in the operating environments 100A and 100B of FIGS. 1A and 1B or another suitable environment. The control process 200 is described with reference to FIG. 2 that includes multiple components (e.g., 102, 108, 116, 181, 185, etc.) described with reference to FIGS. 1A and 1B. Although not depicted in FIG. 2, communication of data and information in the control process 200 may be via the network 118 of FIGS. 1A and 1B or another suitable communication network.

In FIG. 2, the fourth RDP OS session 185D between the second client device 108B and the third client device 108C and the first RDP OS session 185A between the first client device 108A and the host system 116 are depicted. As described with reference to FIGS. 1A and 1B, the fourth RDP OS session 185D is established to enable the second client device 108B to access one or more of the applications 114 on the third client device 108C and the first RDP OS session 185A is established to enable the first client device 108A to access one or more of the applications 114 on the host system 116. The control process 200 may be performed such that the service device 102 can control one or both of the fourth RDP OS session 185D and the first RDP OS session 185A.

The control process 200 may begin by the core system 181 authenticating the service device 102. Authenticating the service device 102 may enable the client devices 108 to verify that the service device 102 is a trusted device and part of the managed network 111 with the client devices 108. Accordingly, the client devices 108 may be able to trust that the service device 102 has authority in the managed network 111.

The core system 181 may have data and information related to the managed network 111. For example, the core system 181 may have information related to roles and privileges assigned to devices of the managed network 111 such as the service device 102 and an administrator 201 associated therewith. To authenticate the service device 102, a request 214 is communicated from the remote-control module 104 to the core system 181. The request 214 may be configured to provide details of the service device 102 and the nature of the remote-control interface. Additionally, in some embodiments, the remote-control module 104 may also communicate login information (in FIG. 2, "login info.") 212. The login information 212 may be of the administrator 201 associated with the service device 102. The core system 181 may have access to data and information that identifies the administrator 201 as an individual who has a role that allows inspection and control of the RDP OS sessions 185. Accordingly, the core system 181 can authenticate the administrator 201 based on the login information 212.

Responsive to an authentication at the core system 181, the authorization module 183 may generate an authentication mechanism such as an access token 210. The access token 210 may include information sufficient to verify that the administrator 201 acting on the service device 102 has a role in the managed network 111. Authentication by the core system 181 provides an internal security feature to ensure and verify to the client devices 108 that the service device 102 and/or the administrator 201 is trustworthy.

The remote-control module 104 may include a control module 202, a selection module 204, and a display module 206. The control module may receive the access token 210 or another suitable authenticated security credential from the core system 181. The control module 202 may then provide the security credential to the client devices 108. For instance, the control module 202 may provide the security credential to the agents 148 or the RDP modules 106. The security credential can verify to the client devices 108 the identity and the role of the administrator 201 seeking to control the RDP OS sessions 185.

After or concurrently with the provision of the security credential, the control module 202 may request OS sessions currently operating on the client devices 108 to which the security credential is/are provided. In response, the client devices 108 may verify the security credential and provide OS session information 218 to the service device 102. The OS session information 218 may include an indication of any console OS sessions running on the client device 108 and the RDP OS sessions 185 running on the client device 108. The OS session information 218 may be provided to the service device 102 in a window or user interface such as an indication 300 described with reference to FIG. 3. In other embodiments, the OS session information 218 may be provided to the service device 102 in another form such as a table, list, set of icons, etc. In some embodiments, the agent 148 may access information related to the OS session information 218. The agent 148 may then populate the OS session information 218 or the indication 300 of FIG. 3 and communicate the information to the service device 102. In some embodiments, the agent 148 may interface with the RDP module 106 to communicate the OS session information 218.

The OS session information 218 may be communicated by the client device 108 that received the security credential. For instance, if the security credential (e.g., 210) is provided to the first client device 108A, the agent 148 on the first client device 108A may provide the OS session information 218 which may include an indication of any console OS sessions and the first RDP OS session 185A. In embodiments in which one of the client devices 108 is involved in multiple RDP OS sessions 185 (such as the third client device 108C in the circumstance of FIG. 1B), the OS session information 218 may include indications of one or more RDP OS sessions 185.

The selection module 204 may be configured to enable selection of one or more of the RDP OS sessions 185 based on the OS session information 218. For instance, in some embodiments, the OS sessions (both console and RDP) on the client device 108 may be communicated to the display module 206, which causes display on a display device 208.

The administrator 201 may then provide input to the service device 102 that is effective to select one of the displayed RDP OS sessions 185. The selection module 204 may then communicate an indication of the selection to the agent 148 of one or more of the client devices 108.

For instance, the control module 202 may be interacting with the agent 148 of the first client device 108A. In the depicted embodiment, the first client device 108A is participating in the first RDP OS session 185A to access the applications 114 on the host system 116. The host system 116 does not have an agent. Accordingly, the selection module 204 may communicate the selection to the agent 148 on the first client device 108A. Alternatively, the second client device 108B and the third client device 108C each have an agent 148. Accordingly, the selection module 204 may communicate the selection to one or both of the agents 148 on the second and third client devices 108B and 108C.

In some embodiments, after the selection is communicated to the client devices 108, a permission request 217 may be communicated to the client devices 108 from the control module 202. The permission request 217 may provide the client devices 108 with an option to allow the remote-control interface to be initiated on the RDP OS sessions 185. An example of the permission request 217 is a control permission window 400 described with reference to FIG. 4. The permission request 217 enables the managed network 111 to balance transparency and privacy with management and control. The permission request 217 may be omitted in some embodiments or may be a simple notification in others.

The control module 202 may communicate instructions to the agents 148 to initiate the remote-control interface with the client devices 108. In some embodiments, the instructions may be communicated in responsive to the selection of one of the RDP OS sessions 185. In some embodiments, the instructions may be communicated in response to a grant of permission responsive to the permission request 217.

The agents 148 may initiate the remote-control interface. In some embodiments, the agents 148 may initiate the remote-control interface responsive to the instruction. While the remote-control interface is operational, the one or more agents 148 transmit visual data 216 of the RDP OS session 185 to the service device 102. The visual data 216 may be some or all the visual data 216 displayed on the client devices 108. The visual data 216 may be received by the display module 206, which causes display of the visual data 216 on the display device 208. The visual data 216 may be communicated in real time or substantially real time to the display module 206. Accordingly, visual data displayed on the display device 208 is concurrent or substantially concurrently with the visual data 216 displayed on the client devices 108. As used herein, substantially real time and substantially concurrently indicates that the communication and display of the visual data 216 is without material delay (e.g., a delay that is less than about 100 or 200 millisecond). Some additional details of the communication of the visual data 216 are provided with reference to FIGS. 5A and 5B.

Additionally, while the remote-control interface is operational, the agents 148 relay RDP control signals 220 from the service device 102. The RDP control signals 220 may be interjected into the RDP OS sessions 185 and/or may push the RDP control signals 220 through the agents 148 into the RDP modules 106. For instance, in some embodiments, the RDP control signals 220 may be communicated from the control module 202 to the agent 148 and through the application 114 via the RDP OS session 185. Similar to the visual data 216, the RDP control signals 220 may be relayed in substantially real time or real time. Accordingly, the administrator 201 may input a command into the service device 102, which may be relayed to the agents 148 without material delay.

In the embodiment of FIG. 2, one remote-control interface is described. In some embodiments, the service device 102 may support multiple remote-control interfaces simultaneously. For instance, a first remote-control interface may control the first RDP OS session 185A and a second remote-control interface may control the fourth RDP OS session 185D. To initiate each of the remote-control interfaces, the control module 202 may provide the security credentials, receive the OS session information 218, may communicate the permission request, and send the instruction to the agent. In both the first and second remote-control interfaces, the visual data 216 may be communicated to the remote-control module 104 and displayed on the display device 208. Moreover, the RDP control signals 220 may be relayed to one or both of the first and second remote-control interfaces via the agents 148.

Figures 3, 4:
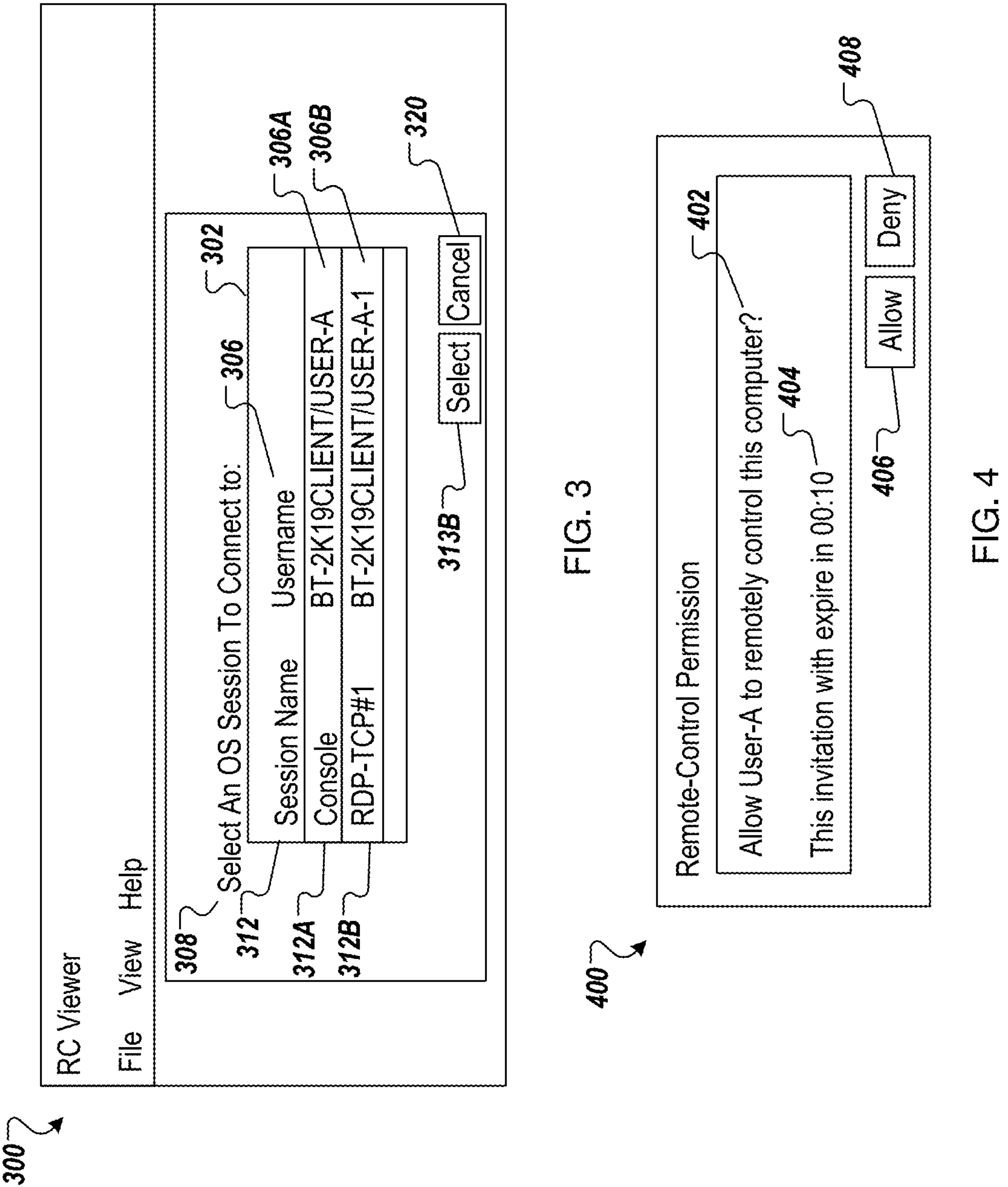
FIG. 3 depicts a block diagram of an example OS session indication that may be implemented in the control process of FIG. 2.
FIG. 4 includes a control permission window that may be implemented in the control process of FIG. 2.

FIG. 3 depicts a block diagram of an example OS session indication 300. The indication 300 displays at least a subset of the OS sessions currently running on a client device. The indication 300 may be implemented in the control processes 200 described with reference to FIG. 2. The indication 300 of FIG. 3 may be presented to a service device responsive to a request for OS sessions currently operating on the client device.

With reference to FIGS. 1A and 3, the indication 300 may be presented on the service device 102 responsive to communication by the service device 102 of a request communicated to the client device 108. The agent 148 may be configured to access information related to the OS sessions and communicate the OS session information such that it may be included in the indication 300 or may generate the indication and communicate it to the service device 102.

The indication 300 may be integrated into a computer window, which is labelled "RC viewer" in the embodiment of FIG. 3. The indication 300 may provide a selection message 308 and a table 302. The table 302 includes a set of OS sessions that are organized by session name 312 and username 306. The session name 312 may represent a type of OS session. In the embodiment of FIG. 3, a first session name 312A is a "console," which may indicate that a first session is an OS session operated by the client device. A second session name 312B is a "RDP-TCP #1," which may indicate that a second session is an RDP OS session. The usernames 306 may represent a name associated with the user of the client device.

To select one of the OS sessions, a user of the service device may select one of the OS sessions and then select a select icon 313B. Selection of one of the OS sessions may communicate an instruction. The instruction may be communicated with the agent 148 to initiate a remote-control interface with the client device implementing the selected OS session. The remote-control interface may be configured such that the agent 148 transmits visual data of the RDP OS session to the service device and relays commands from the service device to the host or client device.

FIG. 4 includes a control permission window 400. The control permission window 400 may be implemented in the control process 200 described with reference to FIG. 2 or other suitable processes. The control permission window 400 may be presented on the client device to request permission by a user of the service device to remote-control the client device.

In some embodiments, the control permission window 400 may be displayed prior to initiation of the remote-control interface. In some embodiments, the control permission window 400 may be displayed prior to communication of information from an agent on a client device and after the RC interface is initiated. For instance, with reference to FIGS. 1A and 4, the control permission window 400 may be displayed at the client device 108 after an RDP OS session has been selected. Additionally or alternatively, the control permission window 400 may be displayed following initiation of the remote-control interface, but prior to communication of information.

The control permission window 400 of FIG. 4 may include a first message 402 and a timer 404. The first message 402 may be a request to allow a "User A" to remote-control a client device. Connected to the first message 402, the control permission window 400 may include an allow icon 406 and a deny icon 408. Selection of the allow icon 406 may allow initiation of the RC interface or allow communication of data via the RC interface. Selection of the deny icon 408 may prohibit initiation of the RC interface or communication of data via the RC interface.

The timer 404 may present a time that indicates a period during which the request for control is valid. Following expiration of the period in the timer 404, the RC interface will no longer be available. For instance, the request for control may include a period of thirty seconds. Following the period of thirty seconds, the invitation to remote-control the client device is withdrawn.

In some embodiments, the control permission window 400 may not be used. For instance, some networks may obtain control without requesting control from a user of the client device at least in some circumstance. Also, in some embodiments a simple icon may be presented that includes a version of the first message 402 or a notification.

Figure 5A:
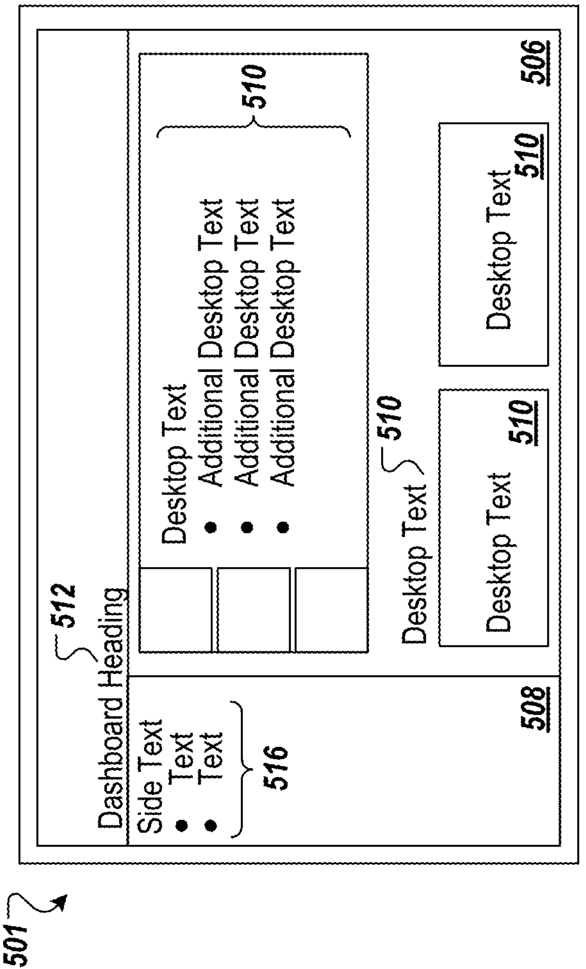
FIG. 5A is a first screenshot that may be displayed on a client device during the RDP OS session during the control process of FIG. 2.
Figure 5B:
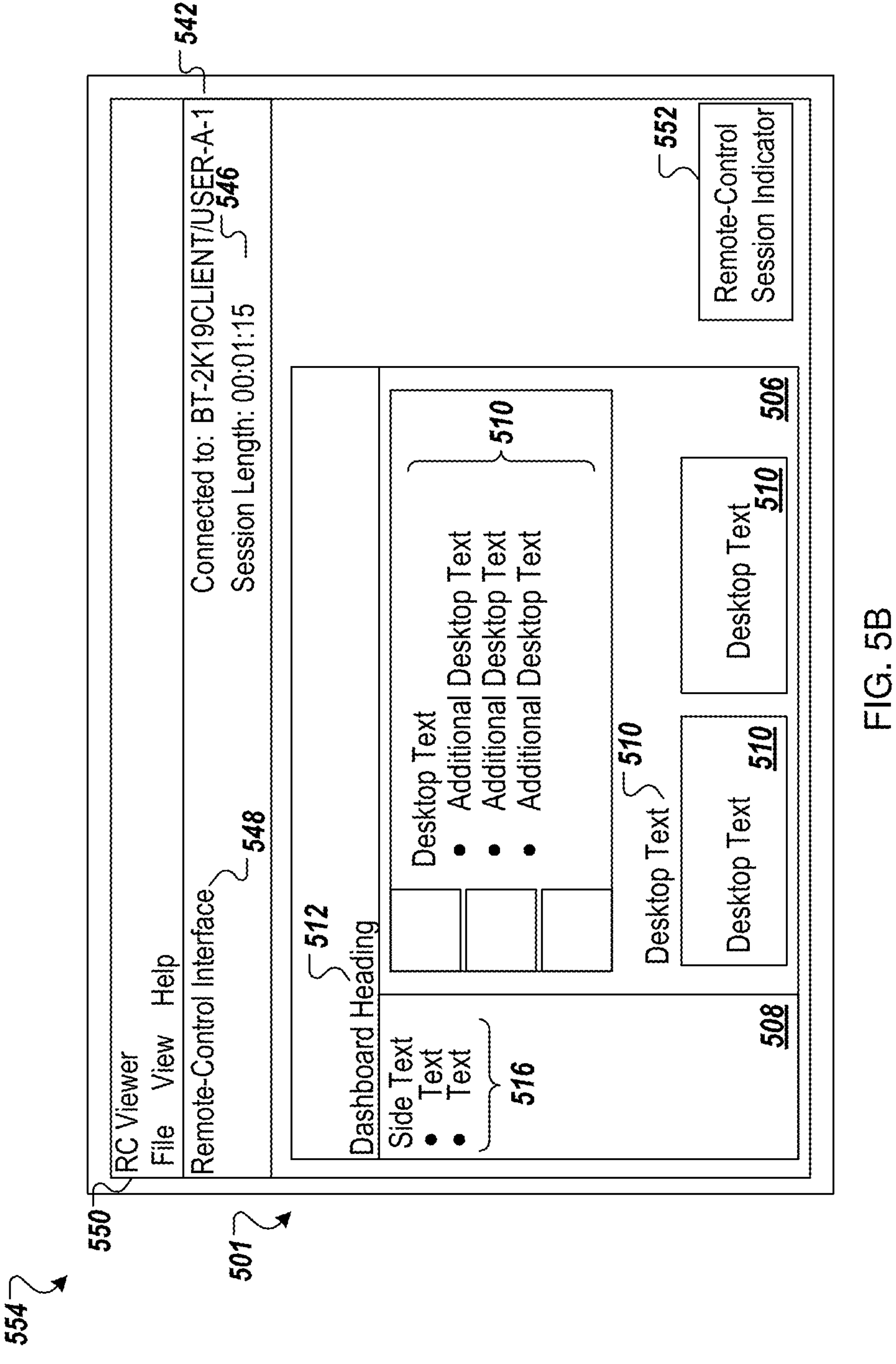
FIG. 5B is a second screenshot that may be displayed on the service device during the RDP OS session during the control process of FIG. 2.

FIGS. 5A and 5B depict block diagrams of screenshots 501 and 554 that may be displayed during an RDP OS session. For instance, during the RDP OS session, the screenshots 501 and 554 may be displayed on a client device and a service device such as the client device 108 and the service device 102 of FIGS. 1A-2. FIG. 5A is a first screenshot 501 that may be displayed on the client device during the RDP OS session at a particular time. FIG. 5B is a second screenshot 554 that may be displayed on the service device during the RDP OS session at the particular time.

The first screenshot 501 includes visual data organized such that a user (e.g., the user 120 of FIG. 1A) may interface with the client device. In the embodiment of FIG. 5A, the visual data of the first screenshot 501 may include a dashboard heading 512, side text 516 in a side bar 508, and desktop text 510 arranged in a central field 506. The user may interface with a portion of the visual data to initiate an action on the client device. For instance, the user might select the side text 516 on the side bar 508 to initiate an action on the client device.

During the RDP OS session, the visual data of the first screenshot 501 may be communicated to the service device. The visual data of the first screenshot 501 may be included on the second screenshot 554 in substantially the same organization and layout of the first screenshot 501. In some embodiments, the first screenshot 501 is displayed concurrently or in essentially real time (e.g., without material delay or only slowed by transmission or processing delays) as the second screenshot 554. Moreover, as the visual data of the first screenshot 501 changes, such changes are reflected at the server device in an updated, second screenshot 554. Accordingly, during the RDP OS session, an administrator of the server device may view in substantially real time information of the first screenshot 501 of the client device.

In some embodiments, an agent such as the agent 148 of FIGS. 1A-2 may access the visual data at the client device and transmit the visual data or some derivative thereof to the server device. At the server device at least some portion of the visual data or derivative visual data may be displayed in the second screenshot 554.

In the second screenshot 554, an RC viewer 550 is displayed. The RC viewer 550 is a user interface of an embodiment of a remote-control module such as the remote-control module 104 of FIGS. 1A-2. The RC viewer 550 includes a remote-control interface 548 in which the first screenshot 501 is displayed during the RDP OS session. The first screenshot 501 may be displayed in the RC viewer 550 responsive to selection of a corresponding session name of the RDP OS session and communication of instructions to initiate a remote-control interface.

For instance, as described with reference to FIGS. 3 and 4, initiation of the RDP OS session may occur through selection in the indication 300 and/or following permission granted via the control permission window 400. In particular, display of the second screenshot 554 including the first screenshot 501 may be responsive to a selection of one of the session names 312 of the table 302 followed by selection of the allow icon 406 by a user. Responsive to the selection of the first RDP OS session, an instruction may be communicated with an agent (e.g., the agent 148) to initiate a remote-control interface with the client device. The remote-control interface may be configured such that the agent transmits visual data of the client device during the RDP OS session to the service device.

In addition to the first screenshot 501, session information 542 and 546 related to the client device may be included in the RC viewer 550. For instance, the session information 542 and 546 includes a device identifier ("BT-2K19CLIENT/USER-A-1" in the depicted example) and a timer that displays a duration of a remote-control session (in FIG. 5B, "00:01:15").

Using the RC viewer 550, commands may be remotely initiated. For instance, an administrator such the administrator 201 of FIG. 2 may provide user input to the RC viewer 550. The user input may include selection of the desktop text 510 in the second screenshot 554. Reception of the user input in the second screenshot 554 may initiate an action as if corresponding desktop text 510 is selected in the first screenshot 501 (e.g., at the client device).

In some embodiments, the user input at the service device may be communicated to the agent (e.g., the agent 148) at the client device. The agent may initiate or implement the user input at the client device. Accordingly, a remote-control of the client device might occur based on user input provided at the service device.

Communication of visual data from the client device to the service device and communication of command instructions from the service device to the client device may occur via the agent simultaneously or concurrently. Accordingly, the agent supports substantially real time communication of the visual data as well as substantially real time communications of commands to the client device.

Figure 6:
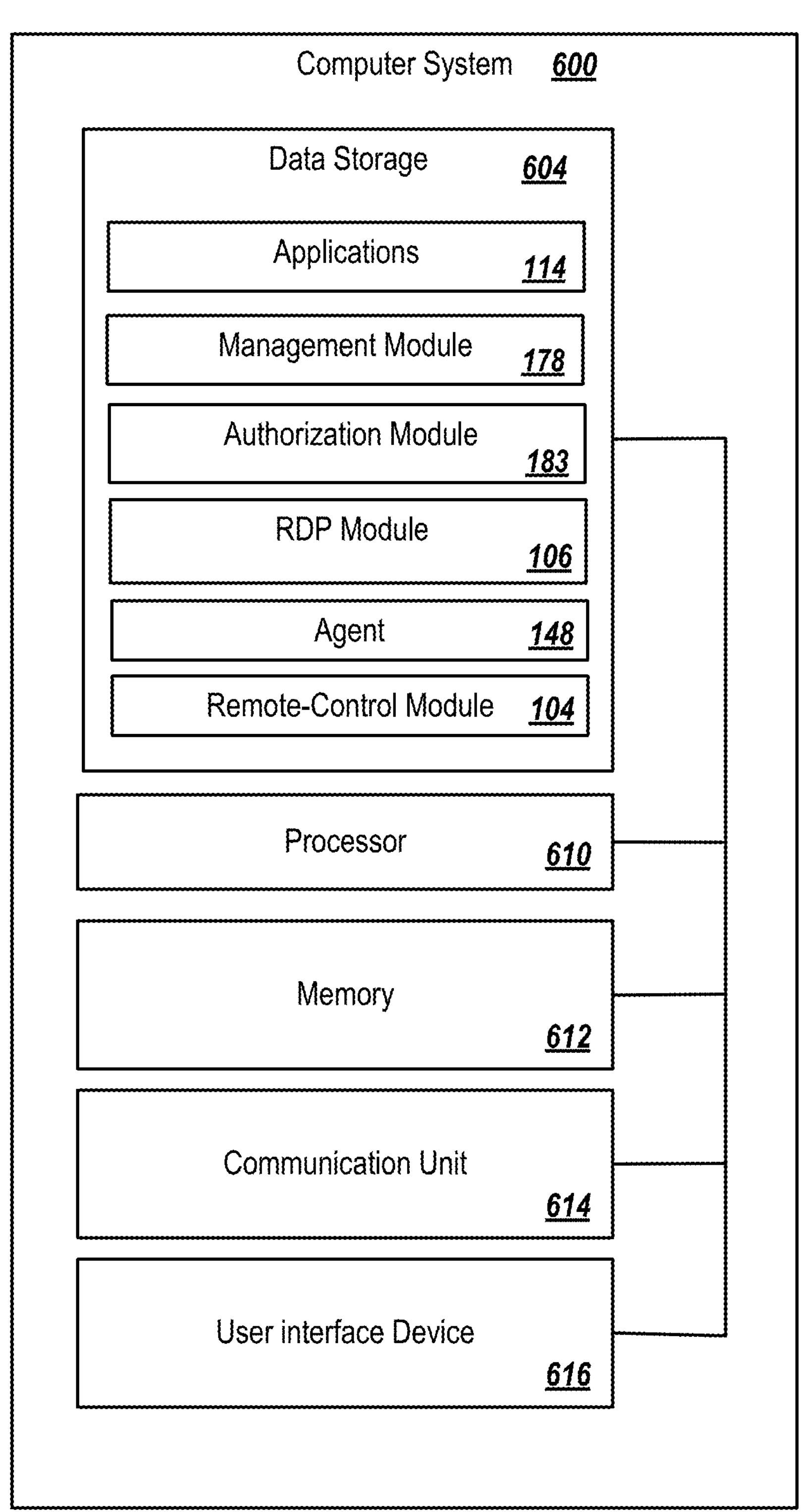
FIG. 6 illustrates an example computing system configured for RDP OS session remote-control.

FIG. 6 illustrates an example computing system 600 configured for RDP OS session remote-control according to at least one embodiment of the present disclosure. The computing system 600 may be implemented in the operating environments 100A or 100B of FIGS. 1A and 1B, for instance. Examples of the computing system 600 may include the client devices 108, the core system 181, the service device 102, the host system 116, or some combination thereof. The computing system 600 may include one or more processors 610, a memory 612, a communication unit 614, a user interface device 616, and a data storage 604 that includes the applications 114, the management module 178, the authorization module 183, the RDP module 106, the agent 148, and the remote-control module 104 (collectively, "RDP modules").

The processor 610 may include any suitable special-purpose or general-purpose computer, computing entity, or processing device including various computer hardware or software modules and may be configured to execute instructions stored on any applicable computer-readable storage media. For example, the processor 610 may include a microprocessor, a microcontroller, a digital signal processor (DSP), an ASIC, an FPGA, or any other digital or analog circuitry configured to interpret and/or to execute program instructions and/or to process data. Although illustrated as a single processor in FIG. 6, the processor 610 may more generally include any number of processors configured to perform individually or collectively any number of operations described in the present disclosure. Additionally, one or more of the processors 610 may be present on one or more different electronic devices or computing systems. In some embodiments, the processor 610 may interpret and/or execute program instructions and/or process data stored in the memory 612, the data storage 604, or the memory 612 and the data storage 604. In some embodiments, the processor 610 may fetch program instructions from the data storage 604 and load the program instructions in the memory 612. After the program instructions are loaded into the memory 612, the processor 610 may execute the program instructions.

The memory 612 and the data storage 604 may include computer-readable storage media for carrying or having computer-executable instructions or data structures stored thereon. Such computer-readable storage media may include any available media that may be accessed by a general-purpose or special-purpose computer, such as the processor 610. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and that may be accessed by a general-purpose or special-purpose computer. Combinations of the above may also be included within the scope of computer-readable storage media. Computer-executable instructions may include, for example, instructions and data configured to cause the processor 610 to perform a certain operation or group of operations.

The communication unit 614 may include one or more pieces of hardware configured to receive and send communications. In some embodiments, the communication unit 614 may include one or more of an antenna, a wired port, and modulation/demodulation hardware, among other communication hardware devices. In particular, the communication unit 614 may be configured to receive a communication from outside the computing system 600 and to present the communication to the processor 610 or to send a communication from the processor 610 to another device or network (e.g., the network 118 of FIGS. 1A and 1B).

The user interface device 616 may include one or more pieces of hardware configured to receive input from and/or provide output to a user. In some embodiments, the user interface device 616 may include one or more of a speaker, a microphone, a display, a keyboard, a touch screen, or a holographic projection, among other hardware devices.

The RDP modules may include program instructions stored in the data storage 604. The processor 610 may be configured to load the RDP modules into the memory 612 and execute the RDP modules. Alternatively, the processor 610 may execute the RDP modules line-by-line from the data storage 604 without loading them into the memory 612. When executing the RDP modules, the processor 610 may be configured to perform one or more processes or operations described elsewhere in this disclosure.

Modifications, additions, or omissions may be made to the computing system 600 without departing from the scope of the present disclosure. For example, in some embodiments, the computing system 600 may not include the user interface device 616. In some embodiments, the different components of the computing system 600 may be physically separate and may be communicatively coupled via any suitable mechanism. For example, the data storage 604 may be part of a storage device that is separate from a device, which includes the processor 610, the memory 612, and the communication unit 614, that is communicatively coupled to the storage device. The embodiments described herein may include the use of a special-purpose or general-purpose computer including various computer hardware or software modules, as discussed in greater detail below.

Figure 7:
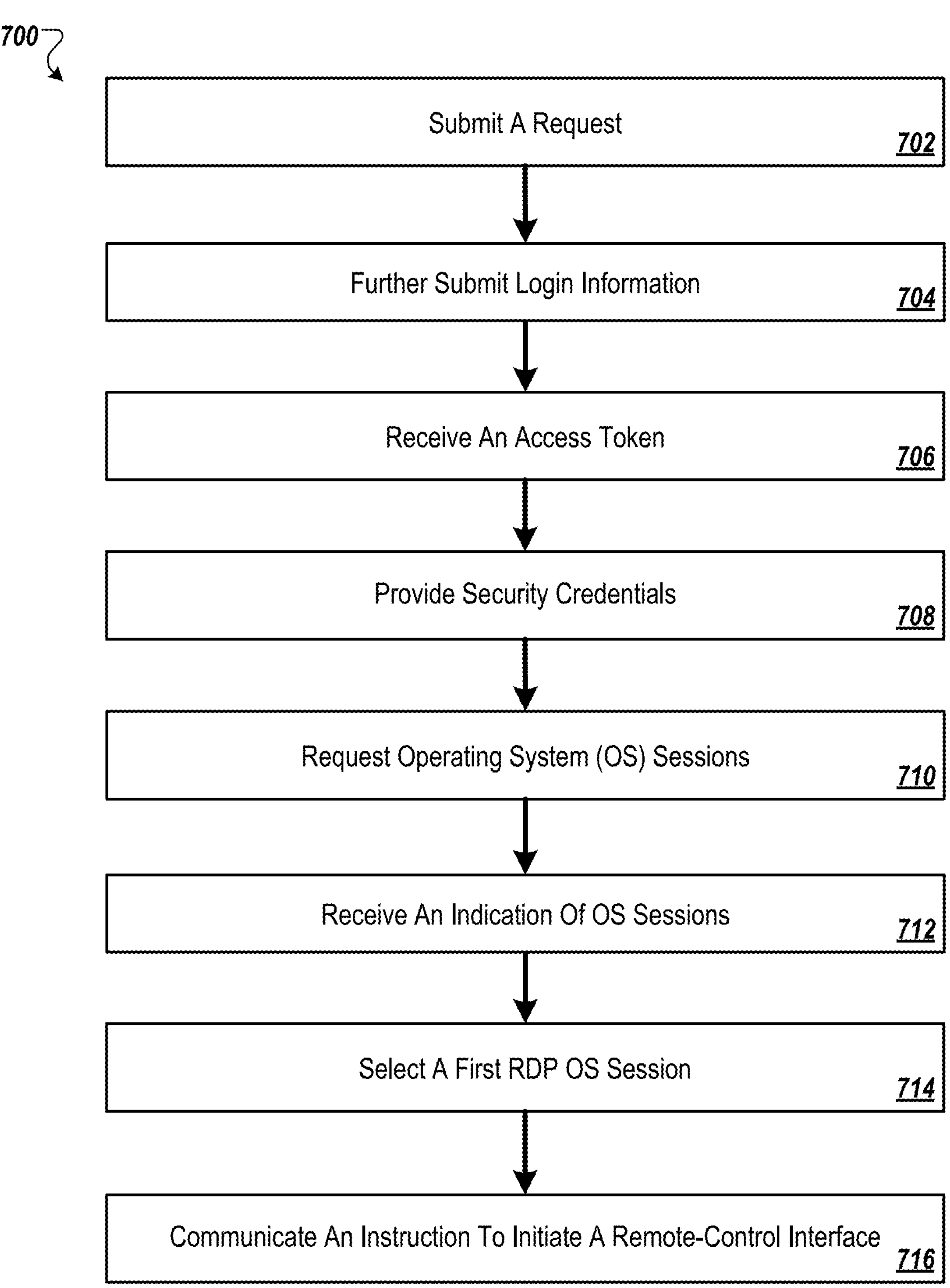
FIG. 7 is a flow chart of an example method of RDP OS session remote-control.

FIG. 7 is a flow chart of an example method 700 of remote desktop protocol (RDP) session remote-control, according to at least one embodiment described in the present disclosure. The method 700 may begin at block 702 in which a request is submitted. The request may be submitted by a service device. The request may be a request for authentication. The request may be submitted to a core system for authentication. At block 704, login information may be further submitted. The login information may be submitted to the core system. At block 706, an access token may be received. The access token may be received from the core system responsive to an authentication performed at the core system.

At block 708, security credentials may be provided. For instance, the service device may provide the security credentials to a client device. The security credentials may include the access token or another computing authentication object. The security credentials may be configured for a particular session. At block 710, operating system (OS) sessions may be requested. The OS sessions may be requested by the service device. The OS sessions that are requested may include the OS sessions currently operating on the client device.

At block 712, an indication of the OS sessions may be received. The indication may be received from an agent on the client device and may include indication of two or more OS sessions currently operating on the client device. The OS sessions on the client device may include one or more RDP OS sessions and one or more console OS session. At block 714, a first RDP OS session of the RDP OS sessions may be selected. Additionally or alternatively, an indication of a selection of the first RDP OS session may be received responsive to a selection of the first RDP OS session. The first RDP OS session may be selected at the service device. For instance, a service provider may select the first RDP OS session using a user interface device. Data representative of the selection by the service provider may be received at the server device. At block 716, an instruction may be communicated. The instruction may be an instruction to initiate a remote-control interface. The instruction may be communicated responsive to the selection of the first RDP OS session. The instruction may be communicated with an agent. The remote-control interface may be configured such that the agent transmits visual data of the RDP OS session to the service device and relays commands from the service device.

In some embodiments, the method 700 may include a communication of a permission signal. For instance, the permission signal may be communicated prior to initiation of the remote-control interface. The permission signal may include display of a control permission window or an icon on the client device. Input from a user may be used to approve permission and enable the remote-control interface to be initiated or to deny permission and prohibit the initiation of the remote-control interface.

In some embodiments, the commands are relayed to a host system. In these and other embodiments, the client device may be accessing an application on the host system via the first RDP OS session. Additionally, data and information communicated from the application at the host system may be relayed to the service device by the agent.

In some embodiments, the commands from the service device may be relayed by the agent to the processor or an application running at the client device. For example, the client device may be hosting an application that is being accessed by one or more secondary devices. In these embodiments, the OS sessions currently operating on the client device include RDP OS sessions of the secondary devices.

The agent may enable the service device to remotely control two or more of the secondary devices. For instance, the method 700 may include selecting a second RDP OS session. The second RDP OS session may be the RDP OS session of one of the secondary devices. Responsive to the selection of the second RDP OS session, the method 700 may include communicating with the agent another instruction to initiate another remote-control interface between the secondary device and service device via the agent at the client device.

Additionally, the method 700 may enable remote-control of multiple RDP OS sessions on multiple client devices. For instance, in some embodiments, the remote-control interface may be a first remote-control interface. Additionally, the client device may be a first client device, the agent may be the first agent on the first client device, and the remote-control interface may be a first remote-control interface. In these and other embodiments, the method 700 may include providing security credentials to a second client device and requesting OS sessions currently operating on the second client device. An indication of OS sessions currently operating on the second client device may be received from a second agent on the second client device. A second RDP OS session of the OS sessions currently operating on the second client device may be selected and responsive to the selection of the second RDP OS session, the method 700 may include communicating with the second agent an instruction to initiate a second remote-control interface with the second client device. The second remote-control interface may be running concurrently with the first remote-control interface.

Figure 8:
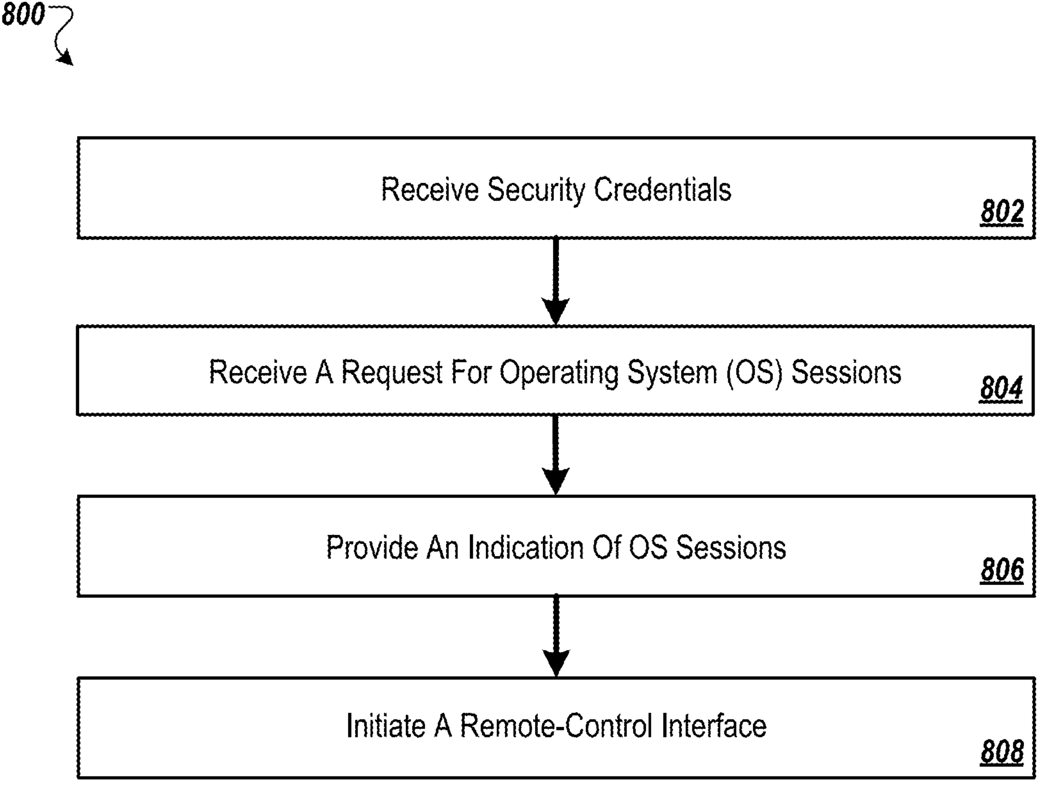
FIG. 8 is a flow chart of another example method of RDP OS session remote-control, all according to at least one embodiment described in the present disclosure.

FIG. 8 is a flow chart of another example method 800 of remote desktop protocol (RDP) session remote-control, according to at least one embodiment described in the present disclosure. The method 800 may begin at block 802 in which security credentials may be received. The security credentials may be received at a client device and may be communicated from a service device. In some embodiments, the security credentials may include an access token provided to the service device following an authentication operation with a core system. At block 804, a request for OS sessions currently operating on the client device may be received. For instance, the service device may communicate the request to the client device requesting the OS sessions. At block 806, an indication of the OS sessions may be provided. For instance, responsive to the request, an agent on the client device may provide the indication of OS sessions currently operating on the client device. The OS sessions may include one or more RDP OS sessions and a console OS session.

At block 808, a remote-control interface may be initiated. The remote-control interface may be initiated by the agent on the client device. For instance, in some embodiments, a selection of a first RDP OS session may be made from the indication of OS sessions. Responsive to receipt of the selection and an instruction to initiate the remote-control interface, the agent may initiate the remote-control interface. The remote-control interface may be configured to enable the agent to transmit visual data of the first RDP OS session to the service device and relay commands from the service device.

In some embodiments, the method 800 may include a receipt and display of a permission signal. For instance, the permission signal may be communicated prior to initiation of the remote-control interface. The permission signal may include display of a control permission window or icon on the client device. Input from a user may be used to approve permission and enable the remote-control interface to be initiated or to deny permission and prohibit the initiation of the remote-control interface.

In some embodiments, the client device is accessing an application on a host system. Accordingly, the remote-control interface may be between the service device and the host system on which an application is installed and accessed by the client device. In these and other embodiments, the agent at the client device may be configured to communicate information between the service device and the host system. For instance, the visual data may be displayed on the service device which would be otherwise communicated to the client device. Additionally or alternatively, command signals generated by the service device may be communicated to the host system.

In some embodiments, the client device is hosting an application that is being accessed by one or more secondary devices. For instance, one or more “thin clients” may use an RDP protocol to access the application at the service device. In these and other embodiments, the OS sessions currently operating on the client device may include RDP OS sessions of each of the secondary devices. Additionally, the service device may be configured to remote-control multiple RDP OS sessions of the secondary devices. For instance, the remote-control interface may be a first remote-control interface. In these and other embodiments, the method 800 may include receiving a selection of a second RDP OS session that is currently running on the client device. For instance, the service device may select the second RDP OS session, which may be an RDP OS session between the client device and one of the secondary devices. Responsive to the received selection, the agent may initiate a second remote-control interface between the secondary device and the service device. After the second remote-control interface is initiated, the agent on the client device may support both the first and the second remote-control interfaces. For instance, the agent may transmit visual data of the second RDP OS session to the service device and relay commands from the service device while the agent simultaneously communicates visual data of the first remote-control interface with the service device.

In some embodiments, the remote-control interface is a first remote-control interface, the service device is a first service device, and the remote-control interface is a first remote-control interface. In these and other embodiments, the method 800 may include receiving, at the client device, security credentials from a second service device and receiving, from the second service device, a request for the OS sessions currently operating on the client device. Responsive to the request, the method 800 may include providing, by the agent on the client device, an indication of the OS sessions currently operating on the client device. The method 800 may further include initiating a second remote-control interface between the second service device and the host system. Initiation of the second remote-control interface may be performed responsive to receipt of a selection of the first RDP OS session of the one or more RDP OS sessions and an instruction to initiate a second remote-control interface. The second remote-control interface may be configured such that the agent transmits the visual data of the RDP OS session to the first service device and to the second service device and/or relays commands from the first service device and the second service device.

The methods 700 and 800 may be performed in a suitable operating environment such as the first operating environment 100A or the second operating environment 100B of FIGS. 1A and 1B, respectively. The methods 700 and 800 may be performed by the service device 102 described elsewhere in the present disclosure or by another suitable computing system, such as the computing system 600 of FIG. 6. The service device 102 implementing or controlling operation of the methods 700 and 800 may be included in a cloud-based networked system, a managed network, managed subnetwork, or another suitable network computing environment. Although illustrated as discrete blocks, one or more blocks of FIGS. 7 and 8 may be divided into additional blocks, combined into fewer blocks, or eliminated, depending on the desired implementation.

Further, modifications, additions, or omissions may be made to the methods 700 and 800 without departing from the scope of the present disclosure. For example, the operations of methods 700 and 800 may be implemented in differing order. Furthermore, the outlined operations and actions are only provided as examples, and some of the operations and actions may be optional, combined into fewer operations and actions, or expanded into additional operations and actions without detracting from the disclosed embodiments.

The embodiments described herein may include the use of a special purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions may include, for example, instructions and data, which cause a general-purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modules running on a computing system.

The various features illustrated in the drawings may not be drawn to scale. The illustrations presented in the present disclosure are not meant to be actual views of any particular apparatus (e.g., device, system, etc.) or method, but are representations employed to describe embodiments of the disclosure. Accordingly, the dimensions of the features may be expanded or reduced for clarity. In addition, some of the drawings may be simplified for clarity. Thus, the drawings may not depict all of the components of a given apparatus (e.g., device) or all operations of a particular method.

Terms used in the present disclosure and the claims (e.g., bodies of the appended claims) are intended as "open" terms (e.g., the term "including" should be interpreted as "including, but not limited to," the term "having" should be interpreted as "having at least," the term "includes" should be interpreted as "includes, but is not limited to," among others). Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in instances in which a convention analogous to "at least one of A, B, and C, etc." or "one or more of A, B, and C, etc."

is used, in general such a construction is intended to include A alone, B alone, C alone, A and B together, A and C together, B and C together, or A, B, and C together, etc. Further, any disjunctive word or phrase presenting two or more alternative terms should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

The terms "first," "second," "third," etc., are not necessarily used to connote a specific order or number of elements. Generally, the terms "first," "second," "third," etc., are used to distinguish between different elements as generic identifiers. Absent a showing that the terms "first," "second," "third," etc., connote a specific order, these terms should not be understood to connote a specific order. Furthermore, absent a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art and are to be construed as being without limitation to such specifically recited examples and conditions. Although embodiments of the present inventions have been described in detail, it should be understood that the various changes, substitutions, and alterations could be made hereto without departing from the scope of the invention.

What is claimed is:

1. A method of remote desktop protocol (RDP) operating system (OS) session remote-control, the method comprising:

submitting, by a service device, a request to a core system for authentication prior to initiating control of an RDP OS session and to receive security credentials from the core system;

authenticating, by the core system, the service device responsive to the request, wherein authenticating of the service device authorizes control an RDP OS session of a second managed device by the service device;

providing the security credentials to the second managed device;

requesting one or more OS sessions currently operating on the second managed device;

receiving an indication of the OS sessions currently operating on the second managed device, the OS sessions including a first RDP OS session and another OS session, wherein the second managed device accesses an application hosted on a first managed device via the first RDP OS session;

receiving a selection of the first RDP OS session; and responsive to the selection of the first RDP OS session, communicating an instruction to initiate a remote control interface between the service device and the second managed device, wherein the remote control interface enables transmission of visual data of the first RDP OS session to the service device and relay of commands from the service device to the application hosted on the first managed device.

2. The method of claim 1, wherein:

the remote control interface is a first remote control interface;

the first managed device further hosts an additional application;

the method further comprising:

remotely accessing the additional application via a second RDP OS session;

receiving the security credentials from the service device;

providing the security credentials to a client device;

requesting, from the client device, one or more OS sessions currently operating on the client device;

receiving, from the client device, an indication of the OS sessions currently operating on the client device that include the second RDP OS session and an additional OS session;

receiving an additional selection of the second RDP OS session; and responsive to the received additional selection, initiating a second remote control interface between the client device and the service device, wherein the second remote control interface enables transmission of visual data of the second RDP OS session to the service device and relay of commands from the service device to the additional application.

3. The method of claim 2, wherein the first remote control interface and the second remote control interface occur concurrently.

4. The method of claim 1, wherein the remote control interface is a first remote control interface; and the method further comprising:

requesting from each client device of a plurality of client devices one or more OS sessions currently operating on each of the plurality of client devices;

receiving additional selections of additional RDP OS sessions via which the plurality of client devices simultaneously access the application; and responsive to the received additional selections, initiating a plurality of remote control interfaces between at least a portion of the plurality of client devices and the service device wherein the plurality of remote control interfaces operates concurrently.

5. The method of claim 1, wherein the first managed device and the second managed device are client devices.

6. The method of claim 1, wherein:

the first managed device is a host system, and the second managed device is a client device.

7. The method of claim 6, wherein the client device is a thin client.

8. The method of claim 1, wherein the security credentials include an access token.

9. The method of claim 1, wherein the request to the core system for authentication includes login information of an entity associated with the service device.

10. A non-transitory computer-readable medium having encoded therein programming code executable by one or more processors to perform or control performance of operations of remote desktop protocol (RDP) operating system (OS) session remote-control, the operations comprising:

submitting, by a service device, a request to a core system for authentication prior to initiating control of an RDP OS session and to receive security credentials from the core system;

authenticating, by the core system, the service device responsive to the request, wherein authenticating of the service device authorizes control an RDP OS session of a second managed device by the service device;

providing the security credentials to the second managed device;

requesting one or more OS sessions currently operating on the second managed device;

receiving an indication of the OS sessions currently operating on the second managed device, the OS sessions including a first RDP OS session and another OS session, wherein the second managed device accesses an application hosted on a first managed device via the first RDP OS session;

receiving a selection of the first RDP OS session; and responsive to the selection of the first RDP OS session, communicating an instruction to initiate a remote control interface between the service device and the second managed device, wherein the remote control interface enables transmission of visual data of the first RDP OS session to the service device and relay of commands from the service device to the application hosted on the first managed device.

11. The non-transitory computer-readable medium of claim 10, wherein:

the remote control interface is a first remote control interface;

the first managed device further hosts an additional application; and the operations further comprise:

remotely accessing the additional application via a second RDP OS session;

receiving the security credentials from the service device;

providing the security credentials to a client device;

requesting, from the client device, one or more OS sessions currently operating on the client device;

receiving, from the client device, an indication of the OS sessions currently operating on the client device that include the second RDP OS session and an additional OS session;

receiving an additional selection of the second RDP OS session; and responsive to the received additional selection, initiating a second remote control interface between the client device and the service device, wherein the second remote control interface enables transmission of visual data of the second RDP OS session to the service device and relay of commands from the service device to the additional application.

12. The non-transitory computer-readable medium of claim 11, wherein the first remote control interface and the second remote control interface occur concurrently.

13. The non-transitory computer-readable medium of claim 10, wherein:

the remote control interface is a first remote control interface; and the operations further comprise:

requesting from each client device of a plurality of client devices one or more OS sessions currently operating on each of the plurality of client devices;

receiving additional selections of additional RDP OS sessions via which the plurality of client devices simultaneously access the application; and responsive to the received additional selections, initiating a plurality of remote control interfaces between at least a portion of the plurality of client devices and the service device wherein the plurality of remote control interfaces operates concurrently.

14. The non-transitory computer-readable medium of claim 10, wherein the first managed device and the second managed device are client devices.

15. The non-transitory computer-readable medium of claim 10, wherein the first managed device is a host system, and the second managed device is a client device.

16. The non-transitory computer-readable medium of claim 15, wherein the client device is a thin client.

17. The non-transitory computer-readable medium of claim 10, wherein the security credentials include an access token.

18. The non-transitory computer-readable medium of claim 10, wherein the request to the core system for authentication includes login information of an entity associated with the service device.

* * * * *